(No Model.)

A. B. HENDRYX.
FISHWAY.

No. 243,893. Patented July 5, 1881.

Witnesses.
J. H. Shumway.
L. D. Rogers.

Andrew B. Hendryx,
Inventor.
By Atty.
John E. Earle

UNITED STATES PATENT OFFICE.

ANDREW B. HENDRYX, OF NEW HAVEN, CONNECTICUT.

FISHWAY.

SPECIFICATION forming part of Letters Patent No. 243,893, dated July 5, 1881.

Application filed May 12, 1881. (No model.)

*To all whom it may concern:*

Be it known that I, ANDREW B. HENDRYX, of New Haven, in the county of New Haven and State of Connecticut, have invented a new Improvement in Fishways; and I do hereby declare the following, when taken in connection with the accompanying drawings and the letters of reference marked thereon, to be a full, clear, and exact description of the same, and which said drawings constitute part of this specification, and represent, in—

Figure 1:
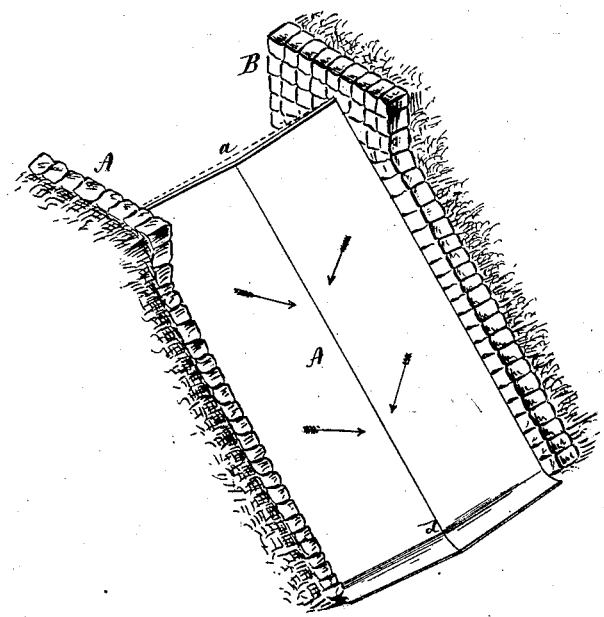
Figure 2:
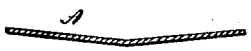

Figure 1, a perspective view; Fig. 2, a transverse section.

This invention relates to an improvement in the construction of dams in rivers, whereby provision is made for fish to pass up the waterfall, commonly called "fishways."

In many cases the water over the fall is so thin that the fish cannot pass up through it. Various devices have been employed more or less complicated, generally forming a circuitous route, through which only fish of more than ordinary intelligence will pass.

It is a well-established fact that if the water passing over a dam is of sufficient depth it makes the best possible fishway. In the common waterfall the depth of the water becomes gradually thinner and less solid toward the bottom of the fall, so that the fish do not get so good a hold in the water as in the deeper or more solid fall.

The object of this invention is to concentrate the water of a fall and cause it to increase in depth or solidity toward the bottom of the fall; and the invention consists in constructing the edge or line of the waste or dam over which the water falls inclined toward a central point, and also an inclined way from the edge, over which the fall breaks, which inclined way also is transversely inclined from the edges toward the center, as more fully hereinafter described.

In the illustration, A represents one abutment, and B the other, of the wasteway—that is, a passage over which surplus water will pass.

Instead of making the line over which the water breaks straight—that is, in a horizontal or level line—I incline the edge or surface over which the water breaks both ways downward toward a central point, $a$, so that a considerably greater amount or body of water will pass over the dam at that point than at either side, which will tend to concentrate the escaping water at that point, and consequently consolidate it, so that at that point in the fall there will be a mass of water sufficient to permit the fish to pass up over the dam. The water breaking over this depressed way may fall directly down; but I prefer that it be conducted so as to make an incline of about forty-five degrees to its fall, and then, to further concentrate the water so that it shall be still deeper and more solid at the termination of the fall, I depress the inclined way A toward a central line running from the point $a$ to the base $d$, Fig. 1, as seen in Fig. 2, which shows a transverse section of the inclined way A. The inclination of the two sides toward the central line, $a\ d$, as indicated by the arrows, brings the mass of the water more solidly together at the termination of the fall, at $d$, than when falling over a plane flat surface.

It is well known that fish will find a direct passage—that is, a passage which corresponds somewhat to the natural flow of water; hence they are readily led to the point where the water falling is drawn in from each side, as at the center of this dam or fishway.

This construction also permits the fish to pass up, even though the quantity of water be small, because it is concentrated, which they could not do were it not for such concentration of the water by inclining the line of break to a central point.

While I have shown the inclination as equal each side of the central point, it will be understood that the inclination may be unequal—that is to say, one side inclining at a greater angle than the opposite side; hence by "central" line or point I wish to be understood as meaning the line or point where the inclination terminates.

I claim—

1. The herein-described fishway, consisting in the edge or surface over which the water breaks, constructed with an inclination toward a central point, substantially as described.

2. The herein-described fishway, consisting in the edge or surface over which the water breaks, constructed with an inclination toward a central point, combined with an inclined surface from the said line of break, and the said inclined surface transversely inclined to a line from said central point, substantially as described.

ANDREW B. HENDRYX.

Witnesses:
JOHN E. EARLE,
L. D. ROGERS.